UNITED STATES PATENT OFFICE.

MAX ENGELMANN, OF ELBERFELD, GERMANY, ASSIGNOR TO FARBENFABRIKEN OF ELBERFELD CO., OF NEW YORK, N. Y., A CORPORATION OF NEW YORK.

PROCESS OF PREPARING DIALKYL-BARBITURIC ACID.

SPECIFICATION forming part of Letters Patent No. 744,732, dated November 24, 1903.

Application filed September 2, 1903. Serial No. 171,700. (No specimens.)

*To all whom it may concern:*

Be it known that I, MAX ENGELMANN, doctor of philosophy, chemist, residing at Elberfeld, Germany, (assignor to the FARBENFABRIKEN OF ELBERFELD CO., of New York,) have invented a new and useful Improvement in Processes of Preparing Dialkyl-Barbituric Acids; and I do hereby declare the following to be an exact and clear description of my invention.

My invention relates to a new process for the production of dialkyl-barbituric acids having the following general formula:

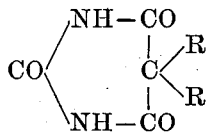

(R meaning an alkyl radical) which bodies possess valuable therapeutic, especially soporific, properties.

The process for the preparation of these compounds consists in first condensing urea and dialkyl cyano-acetic esters of the general formula

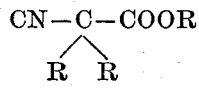

by means of alkali alcoholates, and, secondly, splitting off ammonia from the resulting dialkylated imino dioxypyrimidins of the general formula

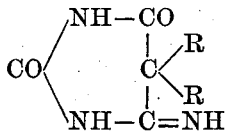

by treatment with saponifying agents.

In order to carry out my process practically, I can, for instance, proceed as follows: Fourteen parts of sodium are dissolved in five hundred parts of alcohol and the solution thus obtained is mixed with one hundred parts of the ethylic ester of diethyl cyano acetic acid and with forty parts of urea. It is heated for six hours on the water-bath, the alcohol is distilled off, and the residual sodium salt of the diethyl imino dioxypyrimidin is decomposed by means of dilute acetic acid. By a recrystallization from hot water the free body is obtained in the shape of crystals melting at 285° centigrade. Ten parts of the 5-diethyl-4-imino-2-6-dioxypyrimidin thus obtained are heated on the water-bath for about half an hour with thirty parts of a fifteen-per-cent. sulfuric acid. The body enters into solution and after some time the diethyl barbituric acid deposits in the shape of needles. It is filtered off, recrystallized from water, and dried. The saponification can also be carried out with other saponifying agents, such as caustic-soda lye or the like. The process proceeds in an analogous manner for the production of the other dialkyl-barbituric acids.

Having now described my invention and in what manner the same is to be performed, what I claim as new, and desire to secure by Letters Patent, is—

1. The process for the production of dialkyl-barbituric acids having the above-given general formula, which process consists in first condensing urea and dialkyl cyano acetic esters by means of alcoholates of alkalies and secondly splitting off ammonia from the resulting 5-dialkyl-4-imino-2-6-dioxypyrimidin by treatment with saponifying agents, substantially as hereinbefore described.

2. The process for the production of diethyl-barbituric acid, which process consists in first condensing urea and diethyl-cyano acetic ester by means of alcoholates of alkalies and secondly splitting off ammonia from the resulting 5-diethyl-4-imino-2-6-dioxypyrimidin by treatment with saponifying agents, substantially as hereinbefore described.

3. The process for the production of diethyl-barbituric acid, which process consists in first condensing urea and the ethylic ester of diethyl-cyano-acetic acid by means of sodium ethylate and secondly splitting off ammonia from the resulting 5-diethyl-4-imino-2-6-dioxypyrimidin by treatment with hot sulfuric acid, substantially as hereinbefore described.

In testimony whereof I have signed my name in the presence of two subscribing witnesses.

MAX ENGELMANN.

Witnesses:
OTTO KÖNIG,
F. A. RITTERSHAUS.